(12) United States Patent
Walls et al.

(10) Patent No.: US 9,894,208 B2
(45) Date of Patent: *Feb. 13, 2018

(54) CONNECTION ROUTING SYSTEM

(71) Applicant: ACCENTURE GLOBAL SERVICES LIMITED, Dublin (IE)

(72) Inventors: Terry L. Walls, Duluth, GA (US); Anuj Bhalla, Lake Hopatcong, NJ (US); Robert Wayne Honts, Austin, TX (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 113 days.

This patent is subject to a terminal disclaimer.

(21) Appl. No.: 14/964,166

(22) Filed: Dec. 9, 2015

(65) Prior Publication Data
US 2016/0088157 A1 Mar. 24, 2016

Related U.S. Application Data

(63) Continuation of application No. 14/486,506, filed on Sep. 15, 2014.

(60) Provisional application No. 61/878,435, filed on Sep. 16, 2013.

(51) Int. Cl.
*H04M 3/523* (2006.01)
*H04M 3/51* (2006.01)

(52) U.S. Cl.
CPC ....... *H04M 3/5233* (2013.01); *H04M 3/5175* (2013.01); *H04M 3/5191* (2013.01); *H04M 3/5231* (2013.01); *H04M 2203/2088* (2013.01); *H04M 2203/408* (2013.01); *H04M 2203/551* (2013.01)

(58) Field of Classification Search
CPC ............ H04M 3/5233; H04M 3/5175; H04M 3/5191; H04M 3/5231; H04M 2203/2088; H04M 2203/408; H04M 2203/551
USPC ..................................................... 379/265.09
See application file for complete search history.

(56) References Cited

U.S. PATENT DOCUMENTS

| | | |
|---|---|---|
| 6,597,783 B1 | 7/2003 | Tada et al. |
| 7,372,952 B1 | 5/2008 | Wu et al. |
| 7,734,032 B1 | 6/2010 | Kiefhaber et al. |
| 2007/0211881 A1 | 9/2007 | Parker-Stephen |

(Continued)

OTHER PUBLICATIONS

Financial Content, Vertical Introduces TeleVantage 7.5; New Multi-site, Automatic Remote Login and Last Agent Routing Capabilities Lower Costs, Improve Productivity and Enhance Customer Service, Jul. 17, 2006. http://markets.financialcontent.com/stocks/news/read/98836/Vertical_Introduces_TeleVantage_7.5.

(Continued)

*Primary Examiner* — Ahmad F Matar
*Assistant Examiner* — Jirapon Intavong
(74) *Attorney, Agent, or Firm* — Mannava & Kang, P.C.

(57) ABSTRACT

According to an example, connections may be routed in a contact center by determining if a current connection from a customer terminal to the contact center is a repeat connection or a first connection. In response to determining that the connection is a repeat connection, the repeat connection is routed to an originating agent terminal when an originating agent is verified as employed, logged-in, and available. In response to determining that the connection is a first connection, the first connection is routed to a best available agent terminal.

18 Claims, 8 Drawing Sheets

(56) References Cited

U.S. PATENT DOCUMENTS

2012/0224681 A1 9/2012 Desai et al.
2014/0211932 A1 7/2014 Zhao et al.

OTHER PUBLICATIONS

Nedatanet, Types of Agent Call Distribution in Vertical Televantage Call Center Queues, Vertical Televantage, Nov. 29, 2008. http://www.nedatanet.com/vertical-televantage/types-of-agent-call-distribution-in-vertical-televantage-call-center-queues/.

CONNECTION ROUTING SYSTEM

PRIORITY

This application is a Continuation of commonly assigned and co-pending U.S. patent application Ser. No. 14/486,506, filed Sep. 15, 2014, which claims priority to Provisional Application Ser. No. 61/878,435, filed Sep. 16, 2013, the disclosures of which are hereby incorporated by reference in their entireties.

BACKGROUND

Large companies that may deal in consumer goods or services often have contact centers. These contact centers typically engage in customer contact through various channels of communication for a variety of reasons. Examples of services provided by contact centers include a support or help desk, which attempts to resolve specific queries from customers such as technical questions, account or payment inquiries, and complaints. A contact center, for instance, may be a coordinated system of people, processes, technologies and strategies that provides access to information, resources, and expertise through appropriate channels of communication, and enables interactions that create value for the customer and company.

Managing call routing or routing of other forms of communication, such as email, online voice and video chats, short message service (SMS) text, instant messaging, etc., for contact centers is a difficult task. For example, large call centers may receive thousands of calls per day and hundreds of calls per hour. These calls should be routed to a proper destination in the call center in real-time so there is no delay in handling the call.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
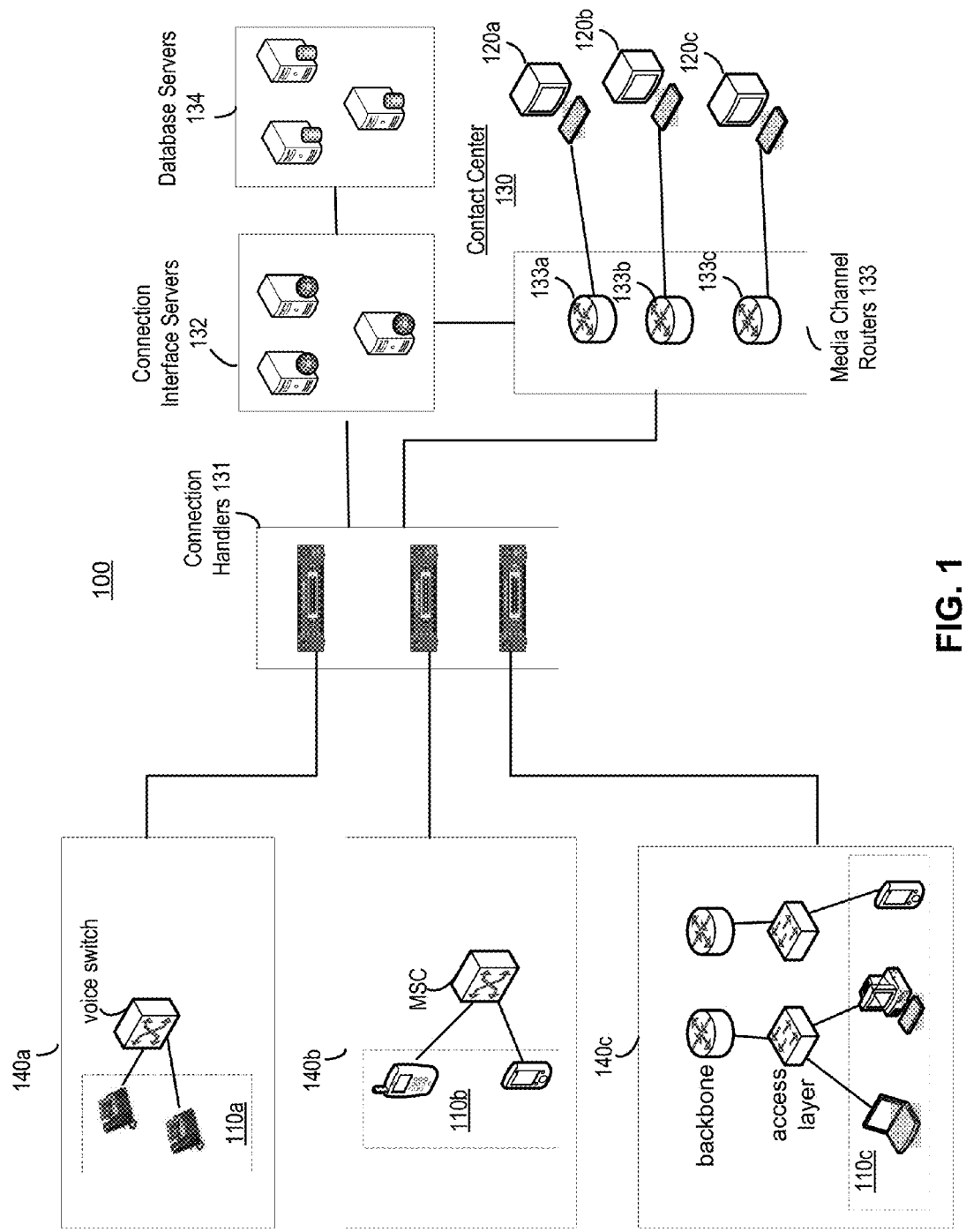
FIG. 1 shows a block diagram of a connection routing system for routing customer terminal connections to agent terminals in a contact center, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples of a connection routing system that routes connections for a contact center. A connection for example is a digital communication and/or an analog communication from a source to a destination. Examples of types of connections are telephone calls, voice-over-Internet Protocol (VoIP) calls, online voice and video chats, instant messaging, SMS text messaging, facsimiles, and other computer-mediated communications.

The connection routing system routes connections for a contact center. In particular, the connection routing system of the disclosed examples may process thousands of connections per day and hundreds of connections per hour that are received at the contact center. These large volumes of connections, which may be received from multiple different media channels, are then routed to a proper agent terminal in the call center in real-time so there is no delay in handling each of the connections.

That is, the connection routing system, for instance, determines in real-time whether each of the thousands of connections are repeat connections; whether each of the thousands of customers have opted to connect with an originating agent; whether each of the originating agents are employed, logged-in, and available at a particular point in time; whether a best available agent should be calculated and identified; whether a future date and time should be scheduled for automatic connection between each customer and each agent; whether to store the data into the thousands of customer experience profiles and the thousands of agent profiles; and whether to increase or decrease the agent workforce based on a historical record of the thousands of processed connections. Based on all these simultaneous determinations on the large volumes of connections, the connection routing system may route the connections to the appropriate agent terminal to handle the customer's issue.

According to an example, the connection routing system provides repeat customers with an option to reconnect to the terminal of an originating agent. An originating agent, for example, is an agent that previously interacted with the repeat customer during a prior connection to the contact center. The connection routing system may include a contact center database, a connection interface, a performance analyzer, a scheduling logic, and a forecast modeler. The contact center database may store metrics including customer experience profile data and agent profile data.

The connection interface may determine if a current connection from a customer terminal to the contact center is a repeat connection or a first connection based on the metrics stored in the contact center database. In response to determining a repeat connection, the repeat connection may be routed to an originating agent terminal if the originating agent is verified as employed, logged-in, and available. In response to determining a first connection, the first connection may be routed to a best available agent terminal.

In this regard, for example, the performance analyzer may calculate an ownership index score for each of a plurality of agents to identify the best available agent terminal. The scheduling logic may schedule a time slot for the originating agent terminal to connect with the customer terminal if the originating agent is either unavailable or not logged-in to the originating agent terminal. The forecasting modeler may project a number of agents to employ in a workforce based on an analysis of the metrics stored in the contact center database, including metrics regarding a number of customers that opt to reconnect with the originating agent.

The disclosed connection routing system reconnects the terminal of a repeat customer to the terminal of an originating agent in an automated fashion and allows the originating agent to take ownership of the customer issue from start to resolution. Accordingly, the connection routing system provides the ability to integrate the desires of customers to work with pre-existing agents into an automated connection routing infrastructure that scales and forecasts a workforce staff required to handle all customer connections.

Standard contact centers do not allow agents to take ownership of customer issues. That is, standard contact centers do not capture or support metrics regarding an agent's ownership of customer issues. That is, when a customer connects to the contact center multiple times regarding a same customer issue, the customer has to reiterate the customer issue each time the customer interacts with the multiple agents. Accordingly, the customer may end up frustrated with this inconsistent experience and this erodes the customer's trust in a company to resolve the customer's issue. Standard contact centers have attempted to allow a customer to interact with an originating agent manually (e.g., direct extensions). However, this circumvents the ability to maintain a reliable workforce staffing model for random connections that arrive at the contact center infrastructure. The manual intervention is not scalable and extremely cost prohibitive.

The disclosed connection routing system improves upon standard contact centers by providing customer service operations in a more efficient and more cost effective manner. For example, the disclosed connection routing system provides customers with the ability to choose whether they want to reconnect with the same originating agent for their issue. Moreover, customers may opt to deal with the originating agent for the repeat issue even if the originating agent is not immediately available. The connection routing system promotes agent ownership by allowing agents to handle their own repeat connections. This allows agents to resolve issues with better customer satisfaction and lower service costs by eliminating unnecessary connections and enhancing the customer experience.

The disclosed connection routing system further provides intelligent routing to identify a customer, their open issue, and their originating agent. Further, a virtual queue is implemented to allow customers to connect to their originating agent without waiting for long durations in large queues. The disclosed connection routing system provides performance measurements and analytics for gauging an agent's ability to resolve issues and maintains the customer's issues within their responsibility until resolution. The disclosed connection routing system may utilize predictive analytics and advanced simulation techniques to update forecasting models to account for customers that opt to receive customer service from their originating agent.

With reference to FIG. 1, there is shown a block diagram of a connection routing system 100 for routing customer terminal connections to agent terminals in a contact center, according to an example of the present disclosure.

The connection routing system 100 may include customer terminals 110, shown as 110a, 110b, and 110c, a contact center 130, database servers 134, and telecommunications networks 140, shown as 140a, 140b, and 140c. The customer terminals 110 are devices that are able to communicate with the contact center 130 through a telecommunications network. Examples of the customer terminals 110 are telephones, smartphones, laptops, tablet computers, desktop computers, etc. The telecommunications networks 140 may include, for example, packet-switched and circuit-switched networks. For example, telecommunications network 140a includes a circuit-switched network that handles voice calls through a voice switch. Voice calls where the callee is the contact center 130 are routed through voice switches to the contact center 130. Telecommunications network 140b may include a cellular network. For example, cellular phones, smartphones or other devices may communicate with the contact center 130 via a mobile switching center (MSC) for voice calls, SMS text, etc. Another example of telecommunications network 140c is shown which includes an Internet service provider (ISP) network. Customer terminals, such as tablets, laptops, smartphones, etc., may connect to the backbone ISP network, which may connect to the Internet, through an access layer, which may include local area networks. The customer terminals may engage in online chat with the contact center 130 by sending packets to the contact center 130 via the telecommunications network 140c.

The database servers 134 may include a repository for storing data for the contact center 130, such as customer experience profile information and agent profile information. The contact center 130 includes connection handlers 131 that can handle both packet-switched and circuit-switched connections and extract connection data and packet data. Examples of the extracted connection data may include source and destination or caller and callee and content.

The connections are then passed to media channel routers 133 to route connections to agent terminals 120. The agent terminals 120 for example are computers with interfaces that allow the agent terminals 120 to communicate with the customer terminals 130 for example via the connection handlers 131. The media channel routers 133 may include multiple routers that are able to route different types of connections. For example, media channel router 133a may route SMS messages; media channel router 133b may route voice over Internet protocol (VoIP) packets; and media channel router 133c may route non-VoIP packets, such as for chat sessions.

According to an example, the connection data that is extracted by the connection handlers 131 are passed to connection interface servers 132 in the contact center 130. Upon receiving connection data extracted from a connection, a connection interface maps the extracted connection data to profile data stored in the database servers 134 in order to determine whether the connection is a first connection or a repeat connection. Depending on whether the connection is a first connection or a repeat connection, the connection interface passes routing information for the connection to one of the media channel routers 133 to route the connection to an originating agent terminal or a best available agent terminal.

If the connection is a first connection, for example, the connection interface may activate the performance analyzer 170 prior to passing routing information to one of the media channel routers 133. The performance analyzer identifies the best available agent to address the customer's issue using predictive analytics on historical data stored in the database servers 134 and passes the identification data to the connection interface. The connection interface may then generate routing information for the best available agent terminal based on a query of the profile of the best available agent, which is stored in the database servers 134.

Figure 2:
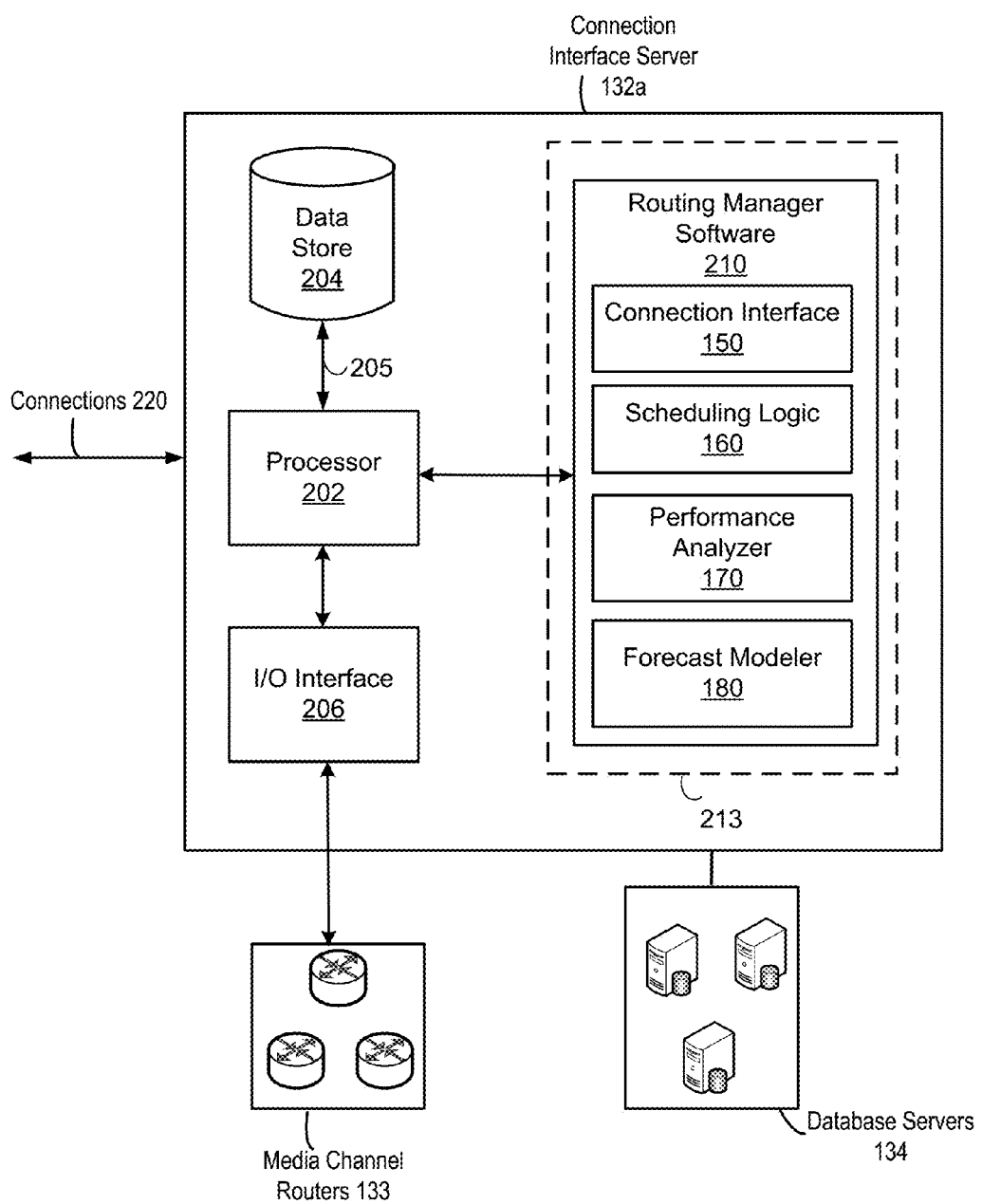
FIG. 2 shows a block diagram of a connection interface server for a contact center, according to an example of the present disclosure.

As is shown in FIG. 2 and described in further detail below, a connection interface server 132 may include a connection interface 150, scheduling logic 160, a performance analyzer 170, and a forecast modeler 180. If the connection is a repeat connection, for example, the connection interface 150 may pass the extracted connection data to the scheduling logic 170 when the originating agent is not logged-in or available at the agent's terminal. The scheduling logic 150 maps the extracted connection data to the originating agent's profile data, which is stored in the database servers 134, to schedule a time to reconnect the customer terminal and the originating agent terminal. The scheduling logic 150 passes the scheduling data to the connection interface 150 to generate routing information for the originating agent terminal based on a query of the profile of the originating agent, which is stored in the database servers 134.

The connection interface 150 may store the extracted connection data, the best available agent data, the originating agent data, the generated routing information, and the scheduling data to the database servers 134 in real-time. The forecast modeler 180 queries the database servers 134 to run predictive analytics and advanced simulation techniques on the queried data to project an optimized number of agents to employ in a workforce for the connection routing system 100 at a particular point in time.

With reference to FIG. 2, there is shown a block diagram of a connection interface server 132*a* for the contact center 130 according to an example of the present disclosure. It should be understood that the connection interface server 132*a* may include additional components and that one or more of the components described herein may be removed and/or modified without departing from a scope of the connection interface server 132*a*.

The connection interface server 132*a* is depicted as including at least one processor 202, a data store 204, an input/output (I/O) interface 206, and routing manager software 210. The components of the connection interface server 132*a* are shown on a single computer as an example and in other examples the components may exist on multiple computers. The connection interface server 132*a* may receive connections 220 from customer terminals 110 and store or manage data in a data store 204. The data store 204 may be local to or remote from the compute device 200. According to an example, the data store 204 may be the database servers 134 described above. The data store 204 may include physical memory such as a hard drive, an optical drive, a flash drive, an array of drives, or any combinations thereof, and may include volatile and/or non-volatile data storage. The connection interface server 132*a* may also store and manage data in a remote computing device through the telecommunications networks 140.

The routing manager software 210 is depicted as including the connection interface 150, the scheduling logic 160, the performance analyzer 170, and the forecast modeler 180. The processor 202, which may be a microprocessor, a micro-controller, an application specific integrated circuit (ASIC), or the like, is to perform various processing functions in the connection interface server 132*a*. The routing manager software 210 may include machine readable instructions stored on a non-transitory computer readable medium and executed by the processor 202 to perform the functions of the connection interface 150, the scheduling logic 160, the performance analyzer 170, and the forecast modeler 180.

The connection interface 150 directs a repeat customer connection to one of an originating agent or a best available agent. For example, the connection interface 150 may identify a customer using one of the customer terminals 110 that is connected to the contact center 130 and determine whether the connection is a first connection or a repeat connection. A customer identification (ID) may be extracted or a MAC address may be determined and used to look up the customer's information in database servers 134. If the connection is determined to be a repeat connection, the connection interface 150 may direct the customer connection to an available originating agent. According to an example, the connection interface 150 may query the customer via the customer terminal to determine if the customer wants to reconnect with an originating agent before routing the connection to the terminal of the originating agent. In this regard, if the customer wants to reconnect with the originating agent, who is temporarily unavailable from the agent terminal, the connection interface 150 may activate the scheduling logic 160 as discussed below. Alternatively, if the customer does not want to reconnect with the originating agent or the originating agent is permanently unavailable, the connection interface 150 may activate the performance analyzer 170 as discussed below.

The scheduling logic 160 schedules a future time and date for the customer to connect with a temporarily unavailable originating agent. For example, if the originating agent is not logged into his terminal or is otherwise temporarily unavailable, a customer may request that the scheduling logic 160 provide a list of future times and dates that the originating agent is available. In this regard, the scheduling logic 160 may connect the customer terminal to the terminal of the originating agent at the time and date selected by the customer. Additionally, as the customer terminal is connected to the terminal of the originating agent, the scheduling logic 160 may inform the originating agent of the repeat connection and populate the terminal of the originating agent with information such as the customer's identification, the time and date of previous connections, and other relevant case data.

The performance analyzer 170 determines a best available agent to address the customer's issue using predictive analytics on historical data gathered from the database servers 134. For example, the performance analyzer 170 may assign a best available agent to the customer based on an analytic metric (e.g., an ownership index score for the agent) when the customer opts out of reconnecting with the originating agent or the originating agent is unavailable.

The forecast modeler 180 utilizes predictive analytics and advanced simulation techniques to project an optimized number of agents to employ in a workforce for the connection routing system 100 at a particular point in time. For instance, the forecast modeler 180 may update a workforce model to reduce the number of agents to account for the number of customers that opt to connect with their originating agent for issue resolution instead of utilizing another agent.

In an example, the routing manager software 210 includes machine readable instructions stored on a non-transitory computer readable medium 213 and executed by the processor 202. Examples of the non-transitory computer readable medium 213 may include dynamic random access memory (DRAM), electrically erasable programmable read-only memory (EEPROM), magnetoresistive random access memory (MRAM), memristor, flash memory, hard drive, and the like. The computer readable medium 213 may be included in the data store 204 or may be a separate storage device. In another example, the routing manager software 210 includes a hardware device, such as a circuit or multiple circuits arranged on a board. In this example, the connection interface 150, the scheduling logic 160, the performance analyzer 170, and the forecast modeler 180 are circuit components or individual circuits, such as an embedded system, an ASIC, or a field-programmable gate array (FPGA).

The processor 202 may be coupled to the data store 204 and the I/O interface 206 by a bus 205, where the bus 205 may be a communication system that transfers data between various components of the connection interface server 132a. In examples, the bus 205 may be a Peripheral Component Interconnect (PCI), Industry Standard Architecture (ISA), PCI-Express, HyperTransport®, NuBus, a proprietary bus, and the like.

The I/O interface 206 may include a hardware and/or a software interface. The I/O interface 206 may be a network interface connected to a network through the telecommunications networks 140, over which the routing manager software 210 may receive and communicate information. For example, the I/O interface 206 may be connected to the media channel routers 133. The processor 202 may store information received through the I/O interface 206 in the data store 204 and may use the information in implementing the connection interface 150, the scheduling logic 160, the performance analyzer 170, and the forecast modeler 180.

FIGS. 3-8 respectively depict flow diagrams of methods 300-800 for routing connections in a call center according to examples of the present disclosure. It should be apparent to those of ordinary skill in the art that the methods 300-800 represent generalized illustrations and that other sequences may be added or existing sequences may be removed, modified or rearranged without departing from the scopes of the methods 300-800. Additionally, methods 300-800 may be implemented using the processor 202 of the connection interface server 132a as discussed above.

Figure 3:
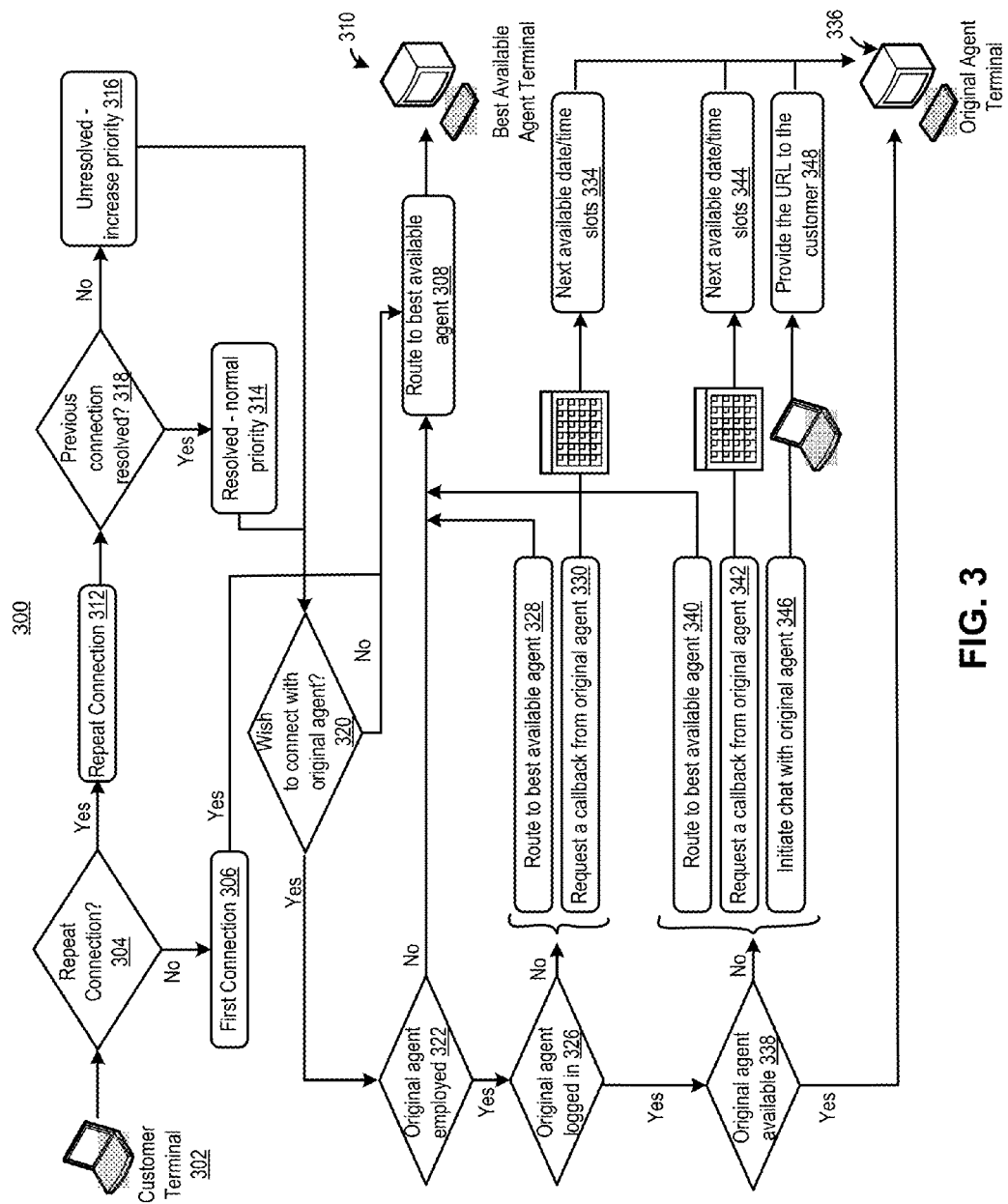
FIG. 3 shows a flow diagram of a method to route voice channel connections in a contact center, according to an example of the present disclosure.

FIG. 3 shows a flow diagram of a method 300 to route voice channel connections in a contact center, according to an example of the present disclosure. As the customer terminal 302 connects to the contact center, the connection interface 150 may identify a customer associated with the customer terminal 302 by a customer identifier or another authentication technique. The identified customer terminal 302 may be mapped (e.g., through the customer identifier, media access control (MAC) address, etc., to the customer's experience profile information, which may be stored in the database servers 134.

Figure 4:
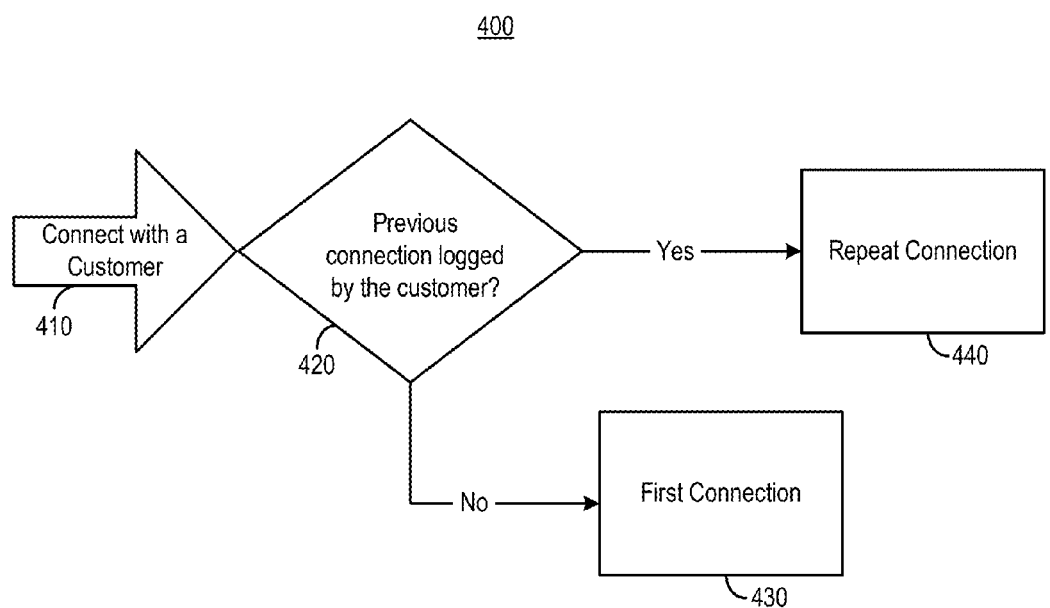
FIG. 4 shows a flow diagram of a method for determining whether a current connection to the contact center is a first connection or a repeat connection, according to an example of the present disclosure.

Based on the customer's experience profile information or lack thereof, the connection interface 150 may determine whether the current connection qualifies as a repeat connection, as shown in block 304. FIG. 4 shows in greater detail a method 400 for determining whether the customer's current connection to the contact center is a first connection or a repeat connection. As shown in block 410, when the contact center is connected with the customer terminal 302, the connection interface 150 may determine if there was a previous connection logged from the customer associated with the customer terminal 302 within a predetermined repeat threshold of time, as shown in block 420.

For example, the predetermined repeat threshold may represent hours between a previous connection and the current connection. The predetermined repeat threshold may be defined by client or situational constraints, or through various scientific or statistical methods. If no connection was logged from the customer associated with the customer terminal 302 within a predetermined repeat threshold of time (e.g., X hours prior to the current connection), the current connection is identified as a first connection by the connection interface 150 in block 430. Otherwise, the current connection is identified as a repeat connection by the connection interface 150 in block 440. The customer's connection log information may be determined by the connection interface 150, for instance, from the customer's experience profile stored in the database servers 134. Referring to block 306 in FIG. 3, if the current connection a first connection, the first connection is directed to the best available agent terminal 310 by the connection interface 150, as shown in block 308.

Figure 5:
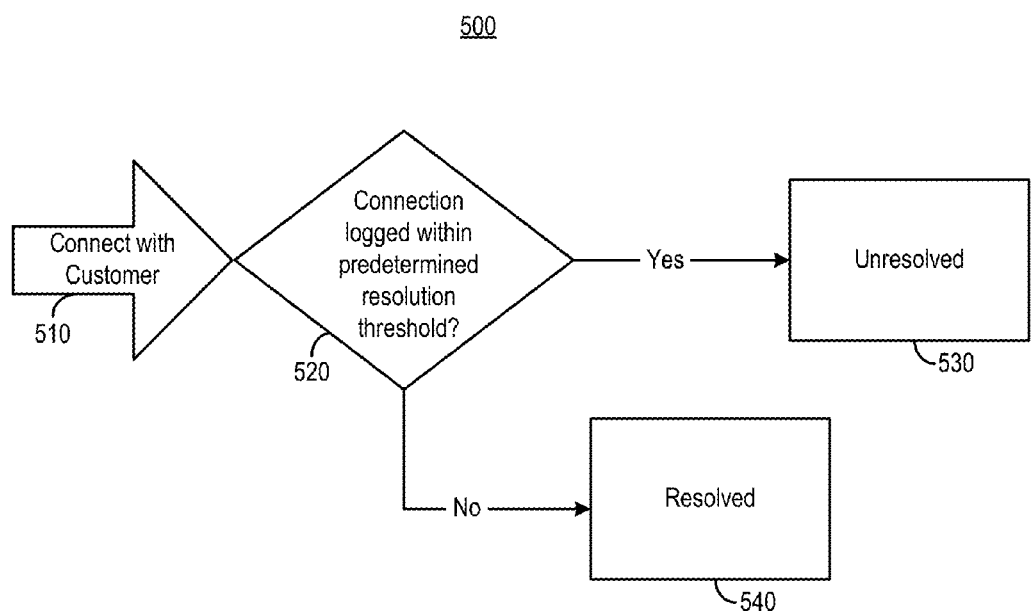
FIG. 5 shows a flow diagram of a method for determining whether a customer issue of a previous connection has been resolved or remains unresolved, according to an example of the present disclosure.

However, if the current connection is a repeat connection as shown in block 312, the connection interface 150 may determine whether the customer issue discussed in a previous connection has been resolved or remains unresolved as shown in block 318. FIG. 5 shows in greater detail a method 500 for determining whether the customer issue of the previous connection has been resolved or remains unresolved. When the contact center is connected with the customer terminal 302 in block 510, the connection interface 150 may determine if a customer issue from the previous connection has been resolved based on whether the customer associated with the customer terminal 302 has logged a connection to the contact center within a predetermined resolution threshold of time after the previous connection as shown in block 520.

For example, the predetermined resolution threshold may represent hours between a previous connection and a subsequent connection regarding the same customer issue. The predetermined resolution threshold may be defined by client or situational constraints, or through various scientific or statistical methods. If there is no subsequent connection logged from the identified customer regarding the same customer issue within the predetermined resolution threshold, the previous connection is marked by the connection interface 150 as a resolved connection as shown in block 530. Otherwise, the previous connection is marked by the connection interface 150 as an unresolved connection, as shown in block 540. The resolution status of the previous connection may then be stored in the customer experience profile by the connection interface 150.

According to an example, the customer experience profile may include a group of connections that are ordered chronologically. The customer experience profile may include connections for the same customer (as represented by a customer identifier). Each customer experience profile may begin with a first connection and eventually end with a resolved connection. All contacts, for example, may belong to a unique customer experience profile. Moreover, a customer experience profile is considered "open" if it does not end with a resolved connection is considered "closed" if it does end with a resolved connection. A repeat customer experience profile is a customer experience profile with more than one connection. A first connection resolved customer experience profile is a closed customer experience profile with only one connection. By definition, it follows that every consecutive connection within a customer experience profile may be within a predetermined repeat threshold of time from each other, either chronologically or reverse chronologically. Connections within the customer experience profile may be from any channel a customer chooses to interact with the contact center.

Referring back to FIG. 3, if the previous connection has been resolved, the priority level for the current connection is maintained, as shown in block 314. However, if the previous connection is unresolved, the priority level for the current connection is increased by the connection interface 150, as shown in block 316.

In block 320, the connection interface 150 may then inform the customer terminal 302 that a previous connection has been discovered and query the customer terminal 302 to determine if whether the repeat connection is related to the previous interaction. In other words, for instance, the connection interface 150 may ask the customer associated with customer terminal 302 whether they would like to reconnect with the originating agent terminal 336.

If the customer associated with customer terminal 302 indicates that the repeat connection is not related to the previous connection or that the customer does not wish to reconnect with the originating agent 336, the repeat connection is routed to a queue for the best available agent terminal 310 as shown in block 308. On the other hand, if the customer associated with customer terminal 302 indicates that the repeat connection is related to the previous connection and that the customer would like to reconnect with the originating agent 310 terminal, the connection interface 150 may identify the originating agent 336 terminal for the repeat connection based on a query of the customer experience profile and the agent profile stored in the database servers 134 as further discussed below.

In block 322, the connection interface 150 may query the database servers 134 to determine whether the originating agent is still employed. If the originating agent is not employed, the repeat connection is routed to the best available agent terminal 310 as shown in block 308. Alternatively, if the originating agent is still employed, the connection interface 150 may query the database servers 134 to determine whether the originating agent is logged in, as shown in block 326.

If the originating agent is not logged in, then the customer terminal 302 may be provided with an option to be route the repeat connection to the best available agent terminal 310 as shown in block 308. Alternatively, the customer terminal 302 may be provided with an option to request a callback when the originating agent has logged in to the originating agent terminal 336, as shown in block 330. If the customer selects the callback option, the scheduling logic 160 may review the schedule of the originating agent and offer available dates and times (e.g., excluding lunch, breaks, training, etc.) for a callback from the originating agent terminal 336 as shown in block 334. For example, the scheduling logic 160 may provide the customer terminal 302 with a list of available future time slots to select for a callback from the originating agent terminal 336. According to an example, if the customer declines a first available time slot from the list of available future time slots, the scheduling logic 160 may provide the customer terminal 302 with another available time slot until the customer accepts one of the available time slots.

Once the customer selects an available time slot from the list of available future time slots, the scheduling logic 160 may schedule an outbound call from the originating agent terminal 336 to the customer terminal 302. Particularly, the customer request is loaded into the scheduling logic 160 to automatically dial the customer terminal 302 at the selected available time slot. During the callback, the scheduling logic 160 may indicate to the originating agent terminal 336 that the callback is a repeat connection by providing key information including the customer identification, the date original connection was made, and case data to the originating agent's terminal. Accordingly, the originating agent has all of the necessary information to interact with the customer.

If the originating agent is logged in, the connection interface 150 may further determine whether the originating agent is available at the originating agent terminal 336 as shown in block 338. In response to the originating agent being available, the repeat connection may be routed to the originating agent terminal 336. However, in response to the originating agent being unavailable at the originating agent terminal 336, the customer 302 may be provided multiple routing options.

For example, the customer terminal 302 may be provided with an option to be route the connection to a queue for the best available agent terminal 310 as shown in block 340. According to another example, the customer terminal 302 may be provided with an option to request a callback when the originating agent 336 is available at the originating agent terminal, as shown in block 342. If the customer selects the callback option, the scheduling logic 160 may review the schedule of the originating agent and offer available dates and times (e.g., excluding lunch, breaks, training, etc.) for a callback from the originating agent terminal 336 as shown in block 344. Since the originating agent is logged in, it is possible for example to provide the customer terminal 302 with a list of available time slots on that same day for a callback from the originating agent terminal 336. According to an example, if the customer declines a first available time slot from the list of available same day time slots, the scheduling logic 160 may provide the customer terminal 302 with another available time slot until the customer accepts one of the available time slots.

Once the customer selects an available time slot from the list of available same day time slots, the scheduling logic 160 may schedule an outbound call from the originating agent terminal 336 to the customer terminal 302. Particularly, the customer request is loaded into the scheduling logic 160 to automatically dial the customer terminal 302 at the selected available same day time slot. During the callback, the scheduling logic 160 may indicate to the originating agent terminal 336 that the callback is a repeat connection by providing key information including the customer identification, the date original connection was made, and case data to the originating agent's terminal. Accordingly, the originating agent has all of the necessary information to interact with the customer.

According to another example, the customer terminal 302 may be provided with an option to initiate a chat when the originating agent terminal 336 is available as shown in block 346. The scheduling logic 160 may, for instance, may provide a universal resource locator (URL) to the customer terminal 302 to connect to the originating agent terminal 336, as shown in block 348.

With reference to block 308, in circumstances where the connection is routed to the best available agent terminal 310, the performance analyzer 170 determines the best available agent associated with the best available agent terminal 310 to address the customer's issue using predictive analytics on historical data gathered from the database servers 134 to identify the best available agent. For example, the performance analyzer 170 may record the number of customers that opt to reconnect with their originating agents and deliver the results to the database servers 134 as resolution metric for each agent.

The performance analyzer 170 may then review the type of customer issue discussed during a connection (e.g., billing, sales, repair, technical support, etc.) and review the best available agents based on the predictive analytic scores for the agents. The predictive analytic scores may be determined based on resolution metrics such as how efficient an agent is in obtaining a resolution to a customer issue, a customer satisfaction score, how many times a repeating customer accepts or declines to connect with the agent. According to one example, an agent's ownership index score may be used by the performance analyzer 170 to select the best available agent. The ownership index score may be calculated by the performance analyzer 170 from the following resolution metrics.

An agent's resolution rate may be calculated as:

[# of resolved connections]/[total # of connections for an agent] for a specified time period.

An agent's customer opt-in rate may be calculated as:

[# of repeat connections where a customer opts to return to the originating agent]/[# of repeat connections].

Thus, an ownership index score of the agent is the product of the analytic metrics of:

[resolution rate]×[opt-in rate].

Figure 6:
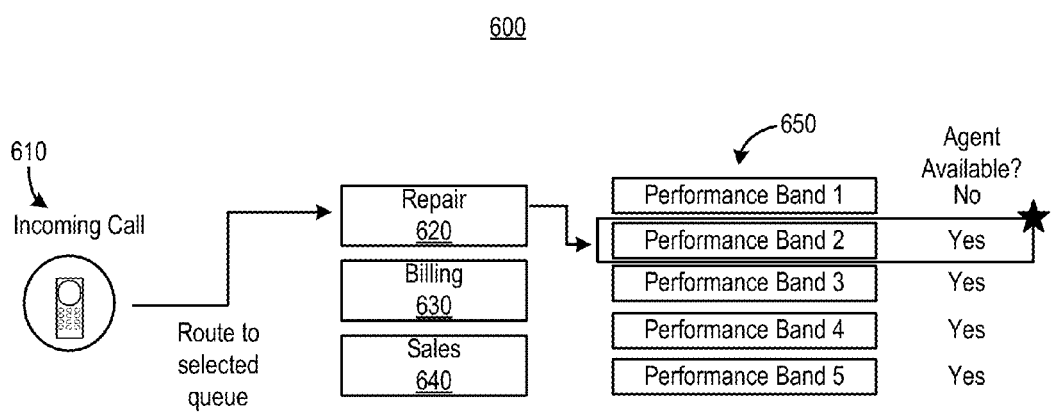
FIG. 6 shows a flow diagram of a method for identifying and routing to a best available agent based on the ownership index score, according to an example of the present disclosure.

Referring to FIG. 6, there is shown a method 600 for identifying and routing to a best available agent based on the ownership index score, according to an example of the present disclosure. Prior to an incoming connection, such as an incoming call 610, an agent's ownership index score is calculated by the performance analyzer 170 for all predefined telephony queues (e.g., a repair queue 620, billing queue 630, and sales queue 640). The performance analyzer 170 may assign all agents a rank, from 1 to n (where n is the number of agents), which is ordered from the highest to the lowest ownership index score. A percentile b may be determined for each agent, where b=[rank/n]. The agents may be grouped into k bands 650, where k is a whole number and is a standard parameter selected by, for instance, an administrator of the contact center. In an example, p=[100/k], where p represents the incremental percentile cut off for each band. Based on an agent's percentile, the agent would be assigned to a band 650 as follows: Band 1: 0<b<=p, Band 2: p<b<=2p, and Band k: (k−1)p<b<=kp=100.

With the agent identifier and the band number, a file is created and loaded into the database servers 134. Accordingly, when a call comes in at block 610, the call is routed to a queue based on the type of customer issue, for instance, and then Band 1 is checked to determine if an agent is available. If an agent is available, then the performance analyzer 170 randomly routes the call to any agent in Band 1. If an agent is unavailable in Band 1, then the performance analyzer 170 checks Band 2 for an available agent. If an agent is available in Band 2, then the performance analyzer 170 randomly routes the call to any agent in Band 2. This, if an agent is not available in Band k−1, then Band k is checked by the performance analyzer 170. If an agent is available, then the call is randomly routed to any agent in Band k. If an agent is unavailable in Band k, then the performance analyzer waits for the next available agent in Band k.

In another example, the connection routing system 100 may be integrated for other channels. That is, the contact center 130 may connect customer terminals to agent terminals in multiple communication channels, such as call center channels, retail store channels, web channels, email channels, SMS channels, social media channels, self-service channels, and the like.

Figure 7:
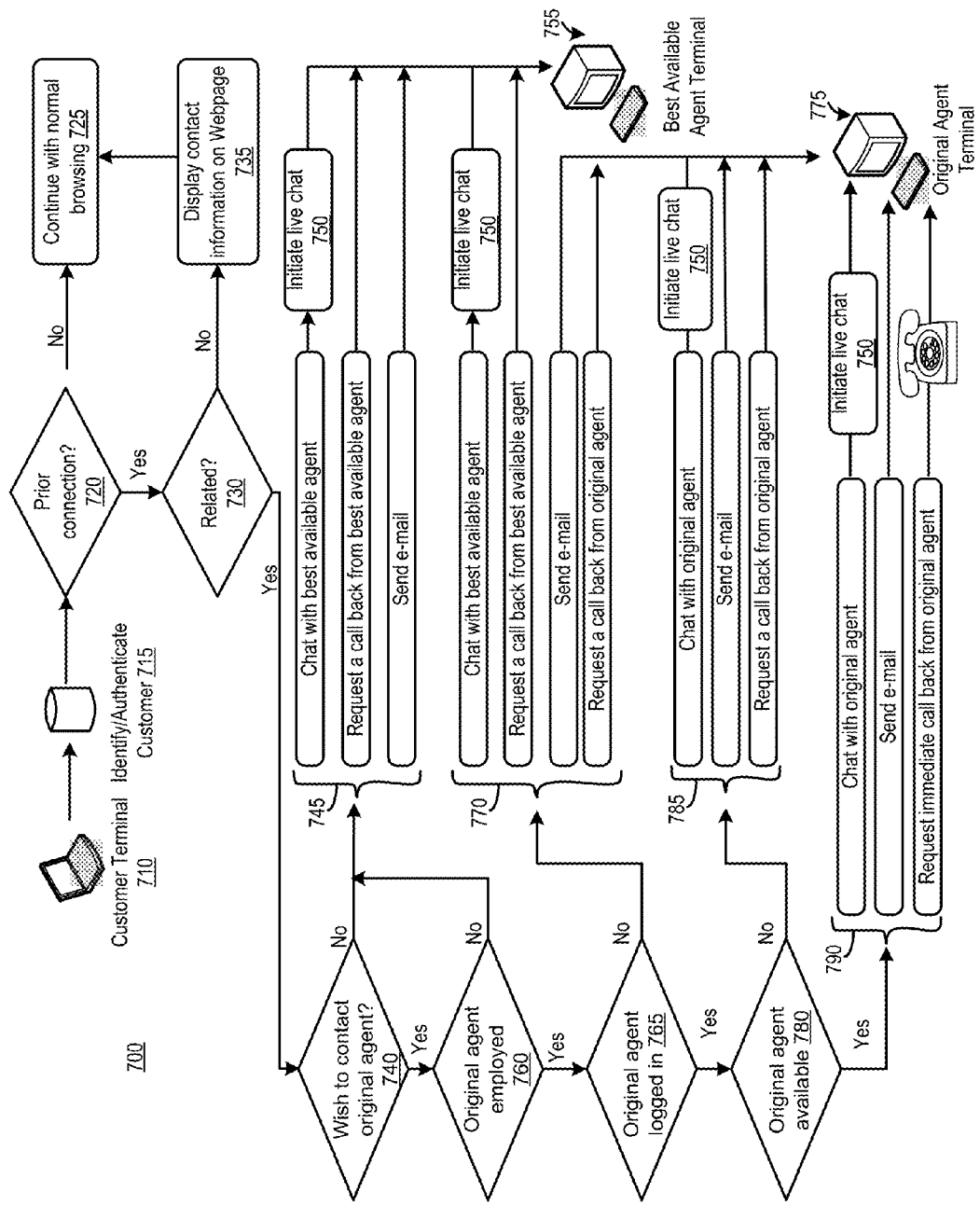
FIG. 7 shows a flow diagram of a method to route web channel connections in a contact center, according to an example of the present invention.

FIG. 7 shows a flow diagram of a method 700 to route web channel connections in a contact center, according to an example of the present invention.

When a customer terminal 710 accesses a website of a company that is associated with the contact center, the customer associated with the customer terminal 710 may be identified and authenticated as shown in block 715. In block 720, the connection interface 150, for instance, may determine if the customer had previously connected to the call center 130 within a predetermined amount of time prior to the current website access. According to an example, the connection interface 150 makes the determination with reference to a connection log for the customer that is stored in the database servers 134.

If the connection interface 150 determines that the customer had not previously connected to the contact center 130 within the predetermined amount of time, then the customer terminal 705 may continue with normal web browsing as shown in block 725. If, however, the connection interface 150 determines that the customer had a previous connection to the call center 130 within the predetermined amount of time, then a determination is made as to whether the current web browsing session is related to the previous connection, as shown in block 730. For example, a pop-up screen may be displayed on the customer terminal 705 to inquire whether the current web browsing session is related to the previous connection of a certain date and time.

If the web browsing session is not related to previous connection, then the connection interface 150 may display contact information on the customer terminal 710 with contact information to connect to an agent as shown in block 735. Alternatively, if the web browsing session is related to the previous connection, the connection interface 150 may send instructions to the customer terminal 710 via the browsing session to display on the customer terminal 170 a plurality of routing options. For example, the connection interface 150 may determine whether the customer wishes to connect with the originating agent terminal 775 as shown in block 740. For example, the connection interface 150 may display a pop-up screen on the on the customer terminal 710 to ask if the customer wishes to connect to the originating agent terminal 775.

If the customer does not wish to connect with the originating agent terminal 775, the connection interface 150 may provide the customer terminal 705 with multiple routing options 745. A routing option may be to chat with a best available agent terminal 755. The best available agent associated with the best available agent terminal 755 may be determined by the performance analyzer 170 as discussed above in FIGS. 3 and 6. When this routing option is selected by the customer, a live chat may be initiated with the best available agent terminal 755 as shown in block 750. Other routing options may include options to request a callback from the best available agent terminal 755 or send an email to best available agent terminal 755. The callback may be may be scheduled for a future date and time by the scheduling logic 160 as discussed above in FIG. 3.

If the customer 705 wishes to connect with the originating agent 775, then the connection interface 150 determines whether the originating agent 775 is employed as shown in block 760. The connection interface 150 may make this determination, for instance, by referencing the originating agent's profile stored in the database servers 134. If it is determined that the originating agent 775 is unemployed, the multiple routing options 745 are provided to the customer 705 as discussed above. According to an example, a pop-up may be displayed on the webpage to inform the customer 705 that the originating agent 775 is not currently employed.

If, however, the originating agent associated with the originating agent terminal 775 is currently employed, the connection interface 150 determines whether the originating agent is logged in as shown in block 765. If the originating agent is not logged in, the customer terminal 705 is provided with multiple routing options 770. The multiple routing options 770 may include options to chat with the best available agent terminal 765 (which, if selected, initiates a live chat with the best available agent terminal 765 as shown in block 750), receive a callback from the best available agent terminal 765, send an email to the originating agent terminal 775, and request a callback from the originating agent terminal 775 at a scheduled future date and time. Based on the selection, the connection may be routed to the best available agent terminal 755 or to the originating agent terminal 775.

In response to determining that the originating agent associated with the originating agent terminal 775 is logged in, then the connection interface 150 may determine whether the originating agent is available at the originating agent terminal 775 as shown in block 780. If the originating agent is unavailable, the customer terminal 705 is provided with multiple routing options 785. The multiple routing options 785 may include an option to chat with the originating agent terminal 775 (which, if selected, initiates a live chat with the originating agent terminal 775 as shown in block 750), send an email to the originating agent terminal 775, and request a callback from the originating agent terminal 775 at a scheduled future date and time. Based on the selection, the customer terminal 705 is routed to the originating agent terminal 775. Alternatively, in response to determining that the originating agent is available, the customer terminal 705 is provided with multiple routing options 790 including options to chat with the originating agent terminal 775 (which, if selected, initiates a live chat with the originating agent terminal 775 as shown in block 750), send an e-mail to the originating agent terminal 775, or request an immediate callback from the originating agent terminal 775. Based on customer selection, the customer terminal 705 is routed to the originating agent terminal 775.

According to an example of the present disclosure, the contact center 130 may include a forecast modeler 180 to project an optimized number of agents to employ in a workforce for the connection routing system 100 at a particular point in time. The forecast modeler 180 may utilize predictive analytics and advanced simulation techniques on metric data stored in the database servers 134. The metric data may be derived from the connection interface 150, the schedule logic 160, and the performance analyzer 170. For instance, the forecast modeler 180 may reduce the number of agents in a workforce model to account for the number of customers that opt to connect with their originating agent for issue resolution instead of utilizing another agent, as determined by the connection interface 150.

Figure 8:
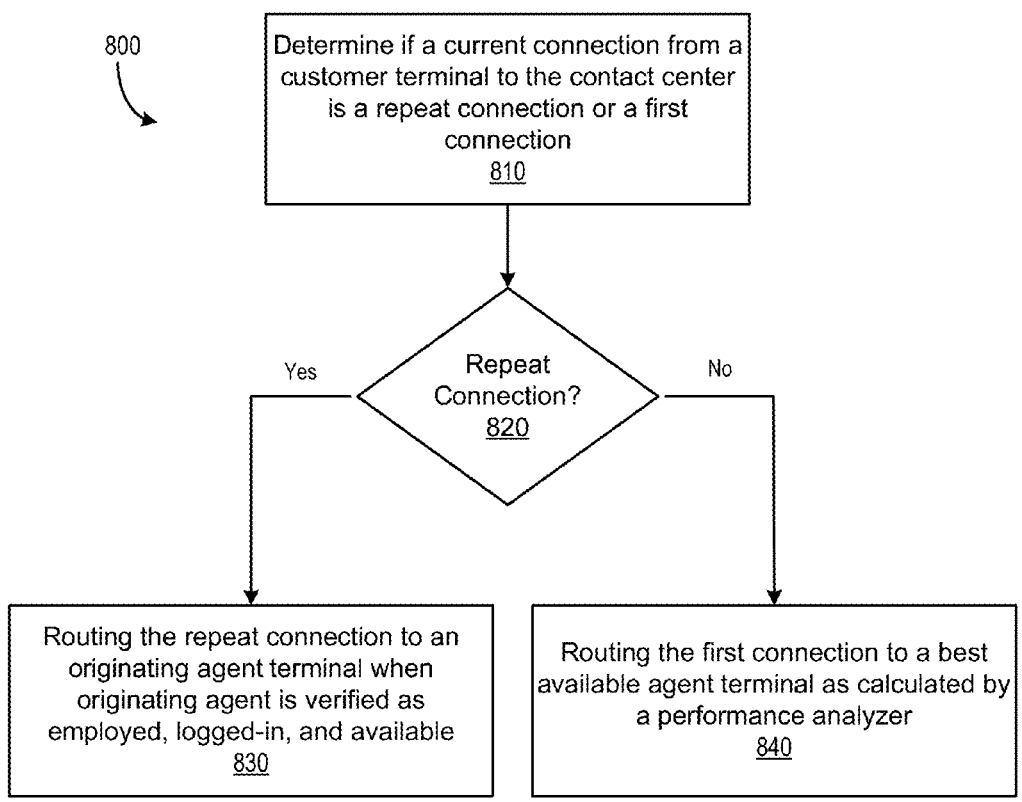
FIG. 8 shows a flow diagram of a method to route connections in a contact center, according to an example of the present invention.

FIG. 8 shows a method 800 to route connections in a contact center, according to an example of the present invention.

At block 810, the connection interface 150, for instance, may determine if a current connection from a customer terminal to the contact center is a repeat connection or a first connection.

In response to determining that the current connection is a repeat connection at block 820, the customer interface 150 may route the customer terminal to an originating agent terminal if the originating agent is verified as employed, logged-in, and available as shown in block 830. According to an example, the connection interface 150 may query the database servers 134 to make the determination of whether the current connection is a repeat connection or a first connection.

Alternatively, in response to determining that the current connection is a first connection at block 820, the customer terminal may be routed to a best available agent terminal as calculated by a performance analyzer 170 as shown in block 840.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A connection routing system, comprising:
a connection interface to:
determine whether a current connection from a customer terminal to a contact center database server is a repeat connection within a predetermined period of time of a previous connection of the customer terminal to the contact center or a first connection based on metrics stored in the contact center database server;
in response to a determination that the current connection is the repeat connection, direct the repeat connection to an originating agent terminal that connected with the customer terminal during the previous connection, and
in response to a determination that the current connection is a first connection, direct the first connection to a best available agent terminal;
a performance analyzer to:
calculate an ownership index score for each of a plurality of agent terminals, where the ownership index is based on a resolution rate and an opt-in rate for each of the plurality of agent terminals, where the resolution rate is determined based on a number of resolved connections for each respective agent terminal and a total number of connections for each respective agent terminal during a predetermined time period, and where the opt-in rate is based on a number of repeat connections in which a customer opts to reconnect to each respective agent terminal and a number of repeat connections for each respective agent terminal,
store the ownership index score for each of the plurality of agent terminals in the contact center database server, and
identify the best available agent terminal based on a highest calculated ownership index score; and
a media channel router to route connections, including at least one of the repeat connection and the first connection, to a destination terminal determined by the connection interface and the performance analyzer.

2. The system of claim 1, comprising scheduling logic to schedule a time slot for the originating agent terminal to connect with the customer terminal in response to verifying that the originating agent terminal is at least one of unavailable or not logged-in to.

3. The system of claim 1, comprising a forecasting modeler to project a number of agent terminals to employ in a workforce based the metrics stored in the contact center database server, where the metrics include metrics regarding a number of customers that opt to reconnect with previously-connected originating agents.

4. The system of claim 1, where, to determine if the current connection is the repeat connection or the first connection, the connection interface is to:
mark the current connection as the repeat connection in response to finding a log of the previous connection within the predetermined period of time; and
mark the current connection as the first connection in response to the absence of the log.

5. The system of claim 4, where, to mark the current connection as the repeat connection, the connection interface is to:
determine if a customer issue associated with the repeat connection is resolved or unresolved; and
in response to a determination that the customer issue is resolved, maintain a queue priority for the repeat connection; and
in response to a determination that the customer issue is unresolved, increase the queue priority for the repeat connection.

6. The system of claim 5, where, to determine whether the customer issue is resolved or unresolved, the connection interface is to:
determine whether a predetermined resolution threshold of time has expired since a previous connection was logged;
in response to an expiration of the predetermined resolution threshold, mark the repeat connection as resolved, and
in response to a non-expiration of the predetermined resolution threshold, mark the repeat connection as unresolved.

7. The system of claim 1, where, to determine the repeat connection, the connection interface is to:
query the customer terminal to determine if a customer opts to reconnect with an originating agent of the originating agent terminal; and
in response to the customer opting to reconnect, direct the repeat connection to the originating agent terminal when the originating agent is employed, logged-in, and available, and
in response to the customer opting not to reconnect, direct the repeat connection to the best available agent terminal as calculated by the performance analyzer.

8. The system of claim 1, where, to determine the repeat connection, the connection interface is to direct the repeat connection to the best available agent terminal as calculated by the performance analyzer in response to verifying that an originating agent of the originating agent terminal is unemployed.

9. The system of claim 1, where, to determine the repeat connection, the connection interface is to:
provide the customer terminal with a plurality of options in response to verifying that an originating agent is not logged-in at the originating agent terminal, where the plurality of options includes at least one of:
directing the repeat connection to the best available agent terminal as calculated by the performance analyzer; and
scheduling a future time slot for the originating agent terminal to connect with the customer terminal as determined by scheduling logic.

10. The system of claim 1, where, to determine the repeat connection, the connection interface is to:
provide the customer terminal with a plurality of options in response to verifying that an originating agent is unavailable at the originating agent terminal, where the plurality of options includes at least one of:
directing the repeat connection to the best available agent terminal as calculated by the performance analyzer;
scheduling a same day time slot for the originating agent terminal to connect with the customer terminal as determined by a scheduling logic; and
initiating a web chat with the originating agent terminal.

11. The system of claim 1, where, to identify the best available agent terminal, the performance analyzer is to:
assign a queue for each category of customer issues;
map a plurality of performance bands to each category, where each of the plurality of performance bands is associated with a predetermined percentile of calculated ownership index scores;
allocate each of the plurality of agent terminals into one of the plurality of performance bands based on their calculated ownership index score; and
select a terminal agent randomly based on one of the plurality of performance bands with a highest calculated ownership index score for a particular category.

12. A method to route connections in a contact center, comprising:
determining, by a connection interface of a contact center, whether a current connection from a customer terminal to the contact center is a repeat connection within a predetermined period of time of a previous connection of the customer terminal to the contact center or a first connection;
in response to determining that the current connection is the repeat connection, routing the repeat connection to an originating agent terminal that connected with the customer terminal during the previous connection; and
in response to determining that the current connection is a first connection, routing the first connection to a best available agent terminal as determined by a performance analyzer based on a query of the contact center database, where determining the best available agent includes:
calculating an ownership index score for a plurality of agent terminals, the ownership index score being based on a resolution rate and an opt-in rate for each respective agent terminal, where the resolution rate is based on a number of resolved connections for each respective agent terminal and a total number of connections for each respective agent terminal during a predetermined time period, and the opt-in rate is based on a number of repeat connections in which a customer opts to reconnect to each respective agent terminal and a number of repeat connections for each respective agent terminal; and
selecting the best available agent terminal from the plurality of agent terminals based on a highest ownership index score.

13. The method of claim 12, where determining the repeat connection further comprises:
querying the customer terminal to determine whether a customer opts to reconnect with the originating agent terminal; and
in response to the customer opting to reconnect, routing the repeat connection to the originating agent terminal when an originating agent previously logged into the originating agent terminal during the previous connection is employed, logged-in, and available, and in response to the customer opting not to reconnect, routing the repeat connection to the best available agent terminal.

14. The method of claim 12, where determining the repeat connection further comprises routing the repeat connection to the best available agent terminal in response to verifying that an originating agent previously logged into the originating agent terminal during the previous connection is unemployed.

15. The method of claim 12, where determining the repeat connection further comprises:

providing the customer terminal with a plurality of options in response to verifying that an originating agent previously logged into the originating agent terminal during the previous connection is not logged-in at the originating agent terminal, wherein the plurality of options includes at least one of:

routing the repeat connection to the best available agent terminal; and scheduling a future time slot for the originating agent terminal to connect with the customer terminal.

16. The method of claim 12, where determining the repeat connection further comprises:

providing the customer terminal with a plurality of options in response to verifying that an originating agent previously logged into the originating agent terminal during the previous connection is unavailable at the originating agent terminal, where the plurality of options includes at least one of:

routing the repeat connection to the best available agent terminal;

scheduling a same day time slot for the originating agent terminal to connect with the customer terminal; and initiating a web chat with the originating agent terminal.

17. The method of claim 12, where selecting the best available agent further comprises:

assigning a queue for each category of customer issues;

mapping a plurality of performance bands to each category, wherein each of the plurality of performance bands is associated with a predetermined percentile of calculated ownership index scores;

allocating each of the plurality of agent terminals into one of the plurality performance bands based on their respective calculated ownership index score; and selecting an agent terminal randomly from one of the plurality of performance bands with a highest calculated ownership index score for a particular category.

18. A method to route connections in a contact center, comprising:

determining, by a connection interface of a contact center, that a web browsing session on a customer terminal is related to a previous connection to the contact center;

sending instructions from the connection interface to the customer terminal via the browsing session to display on the customer terminal a plurality of routing options on the customer terminal in response to a determination that an originating agent interacting with the customer terminal during the previous connection via an originating agent terminal is verified as employed, logged-in, and available, the plurality of routing options including at least one of initiating a chat session on the originating agent terminal, sending an e-mail to the originating agent terminal, and requesting a call back from the originating agent terminal; and scheduling a call back from a best available agent terminal when the customer terminal declines to connect with the originating agent terminal or in response to a determination that the originating agent is not employed or not logged-in, where the best available agent terminal is based on an ownership index score determined based on a resolution rate and an opt-in rate for each of a plurality of agent terminals, where the resolution rate is based on a number of resolved connections for each respective agent terminal and a total number of connections for each respective agent terminal during a predetermined time period, and the opt-in rate is based on a number of repeat connections in which a customer opts to reconnect to each respective agent terminal and a number of repeat connections for each respective agent terminal.

* * * * *